No. 627,873. Patented June 27, 1899.
F. R. PARKS.
SEED PLANTER AND PLANT SETTING MACHINE.
(Application filed June 30, 1898.)
(No Model.) 3 Sheets—Sheet 1.
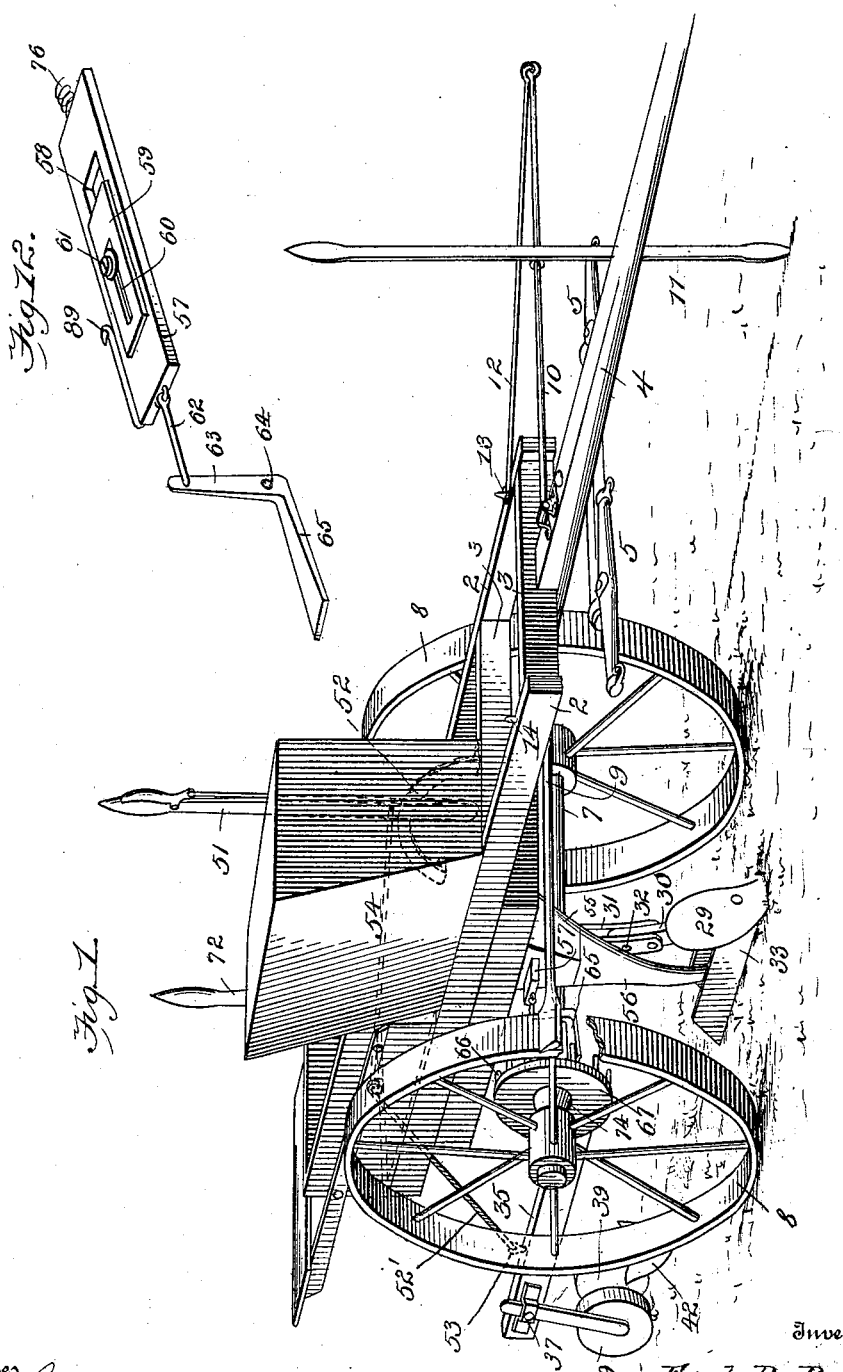
Inventor
Fred R. Parks.

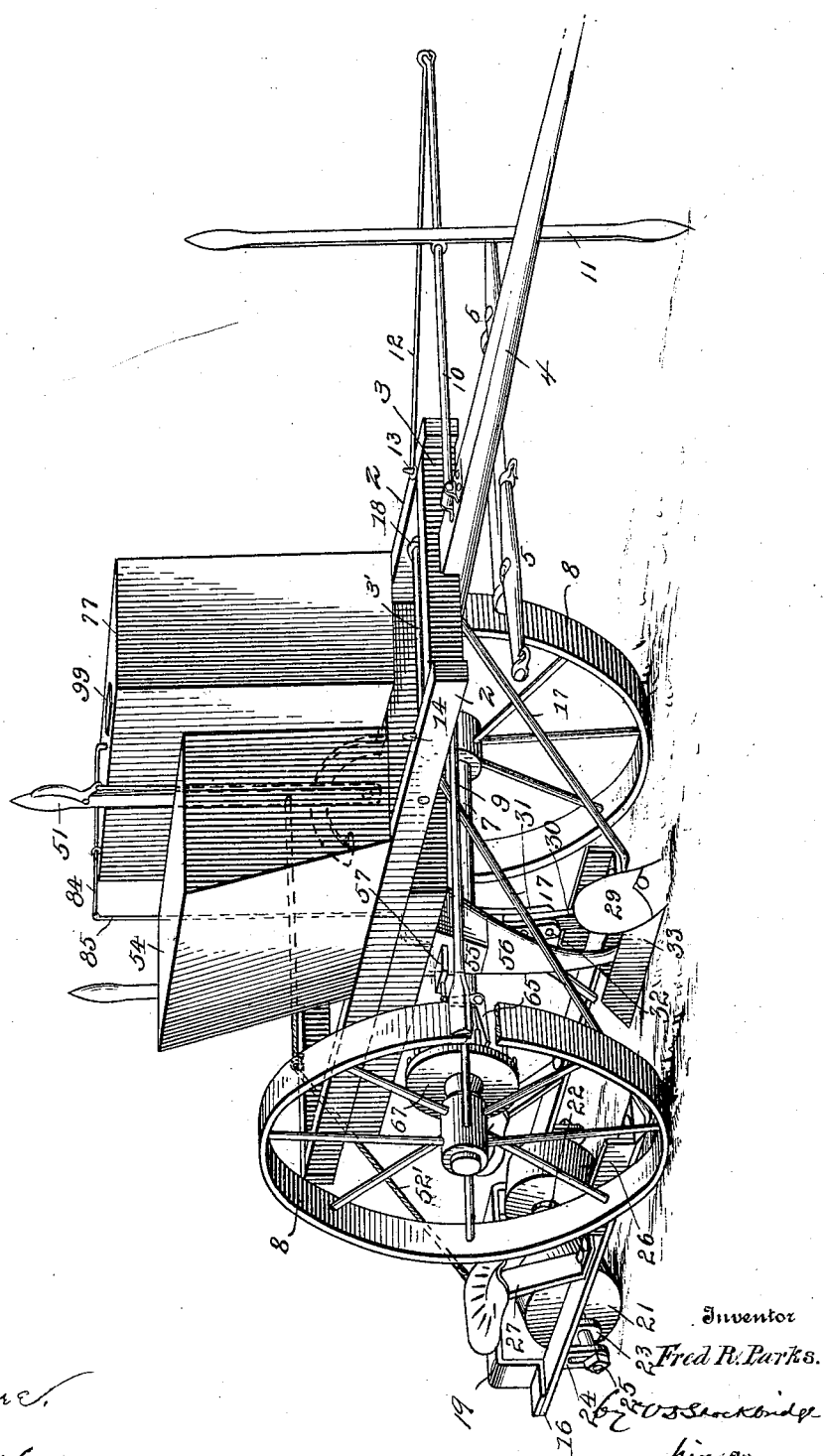

No. 627,873. Patented June 27, 1899.
F. R. PARKS.
SEED PLANTER AND PLANT SETTING MACHINE.
(Application filed June 30, 1898.)
(No Model.) 3 Sheets—Sheet 3.
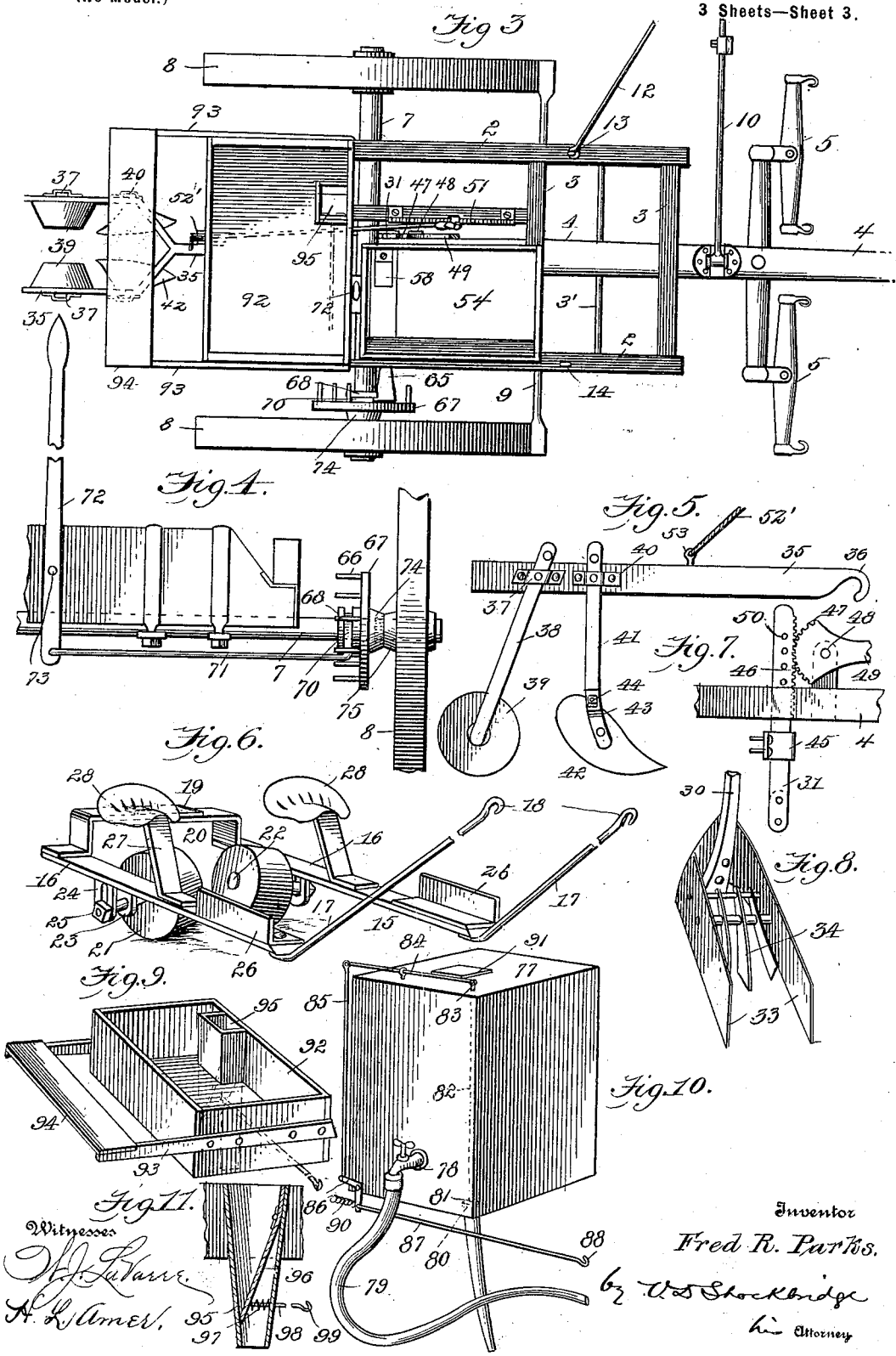
Inventor
Fred R. Parks.

UNITED STATES PATENT OFFICE.

FRED R. PARKS, OF WATER VALLEY, NEW YORK.

SEED-PLANTER AND PLANT-SETTING MACHINE.

SPECIFICATION forming part of Letters Patent No. 627,873, dated June 27, 1899.

Application filed June 30, 1898. Serial No. 684,875. (No model.)

*To all whom it may concern:*

Be it known that I, FRED R. PARKS, a citizen of the United States, residing at Water Valley, in the county of Erie and State of New York, have invented certain new and useful Improvements in Seed-Planters and Plant-Setting Machines; and I do hereby declare the following to be a full, clear, and exact description of the invention, such as will enable others skilled in the art to which it appertains to make and use the same.

This invention relates to a combined seed-planter and plant-setting machine; and it consists, essentially, of a frame adapted to support a fertilizer and seedbox, as well as a water-tank, and having a marker, together with mechanism for operating a clutch and devices for actuating a seed slide or feed for controlling the distribution of the fertilizer or seed, and also an adjustable plow-beam supporting a furrow-plow, which is adapted to tilt or be thrown over in striking a resisting obstruction and having in the rear thereof furrow-closing wings and plant-setting rollers.

The invention further consists of the details of construction and arrangement of the several parts, which will be more fully hereinafter described and claimed.

The object of the invention is to produce a machine of the character set forth capable of rearrangement or interchange of parts to adapt it for planting any kind of seed, as well as fertilizing the same, and also of setting different species of plants and simultaneously watering or moistening them, the parts being simple and effective in their construction and operation, strong and durable, easily and readily operated, and comparatively inexpensive in cost of manufacture.

In the accompanying drawings, Figure 1 is a perspective view of the machine, showing the fertilizer-distributer, potato-hopper, &c., in position for use. Fig. 2 is a similar view showing the fertilizer-hopper, water-tank, and also the auxiliary frame equipped with the covering and banking rollers. Fig. 3 is a plan view of the machine. Fig. 4 is a rear elevation of the axle, showing the means for throwing the operative parts of a machine into and out of gear. Fig. 5 is a side elevation of the beam and its attachment. Fig. 6 is a detail perspective view of the auxiliary frame and its attachment. Fig. 7 is a detail view illustrating the manner of elevating the plow-standard. Fig. 8 is a detail perspective view of the furrow-plow guard and pulverizing-knives. Fig. 9 is a detail perspective view of the potato-planting hopper and chute. Fig. 10 is a similar view of a water-tank. Fig. 11 is a detail sectional view of the chute for the potato-hopper.

Similar numerals of reference designate corresponding parts in the several views.

The frame of the machine comprises a pair of parallel bars 2, spaced apart at a suitable distance and having inwardly-extending cross-strips 3 and a transverse rod 3' at the front portions thereof, which form a partial support for a tongue 4, and to the latter the draft-attaching devices 5 are connected. The parallel bars 2 are supported on a frame having bearings for an axle 7, and on the outer ends of said axle are ground-wheels 8. To the front parts of the bars 2 is secured a transverse scraper-bar 9, the ends of which project over and lie close to the peripheries of the ground-wheels 8 and serve as mud-scrapers to clean the wheels continuously, and thereby lighten the tractive resistance. The rear end of the tongue 4 is also attached to the central portion of the said scraper-bar, and projecting outwardly from one side of the tongue, as shown, is an elongated arm 10, pivotally attached to said tongue at its inner end and having on the outer portion thereof markers 11. This arm, carrying the markers 11, may be swung over to the opposite side to mark the ground on the return movement of the machine after one course has been pursued, the marker-arms being adjustable on the arm 10 to accommodate spacing the rows at any desired distance apart. To hold the arm in firm position and against yielding movement, the outer end of a brace 12 is attached thereto and has its inner end removably secured to a pin or analogous fastening 13 on the adjacent bar 2, and when the said arm is thrown over to the opposite side the inner end of the brace is disconnected from the pin or analogous fastening 13 and in a similar manner attached to a companion pin or fastening on the opposite bar 2, as indicated by 14.

The auxiliary frame (indicated at 15) comprises substantially parallel and horizontal side bars 16, having at their forward ends upwardly and forwardly inclined rods 17, provided at their forward ends with hooks 18 to engage pins or hooks on the machine-frame adjacent to the axle. The rear ends of the bars 16 are connected by an arch-shaped yoke 19, comprising sections 20, which overlap each other, the overlapping portions being slotted and connected by a through-bolt, whereby the sections may be adjusted relatively to and upon each other for varying the distance between the rear ends of the bars 16. Each bar carries a roller 21, the rollers serving to bank the earth upon both sides of the plants. Each roller is mounted upon a separate spindle or axle 22, which is journaled in a depending bracket 23 on its respective bar 16. The outer end of the spindle 22 passes through a vertically-slotted plate 24, extending downward from the bar 16, and the spindle is secured at any point lengthwise of said slotted plate by means of a clamping-nut 25, thus enabling the angles of the shafts of both rollers to be equally adjusted, so as to cause the rollers to form a ridge of any desired height. At their forward ends the bars 16 are provided with foot-rests 26 and at intermediate points with seat-standards 27, whereby the seats 28, supported thereon, are located over the rollers 21. Two operators occupy the seats 28 for setting plants, the operators setting alternate plants, thus expediting and facilitating the work.

29 designates the furrow-plow, which has an upwardly-projecting shank 30, provided with two or more openings, the said shank being received in the lower bifurcated end of a standard 31, provided also with openings in alinement with the openings in the shank 30. A pivot-pin passes through one set of openings in the shank 30 and standard 31, and a wooden pin (indicated at 32) is passed through the other openings, the wooden pin by reason of its weakness being adapted to break when the furrow-plow strikes a hard substance, so as to allow the plow to swing backward and prevent injury thereto. Extending rearwardly from the furrow-plow 29 are substantially parallel plates or guards 33, which prevent the soil from falling inward into the furrow, and thus enable the potatoes or seed to be planted in the deepest portion of the furrow. Arranged between the guards 33 is a series of pulverizing-blades 34, which disintegrate and loosen the soil, thus preparing it the better to receive the seed. The potatoes or seed or fertilizer, as the case may be, will drop between the guards 33 immediately in rear of the blades 34.

35 designates a plow-beam which is provided at its forward end with a hook 36, by which it may be detachably connected to the main frame adjacent to the axle. At the rear end of the beam 35 are arranged clips 37 to receive standards 38, carrying at their lower ends rollers 39, spaced apart so as to straddle the plants and designed to bank up the earth at each side thereof. In advance of the clips 37 are other clips 40, in which are adjustably received standards 41, carrying at their lower ends covering-shovels 42, by which the earth at each side of the furrow is thrown inward. These shovels 42 are provided with upwardly-extending slotted arms 43, connected by means of bolts 44 to the standards 41, so that the angle and pitch of each shovel 42 may be operated to cause it to throw the earth inward more or less, as may be desired.

The standard 31 passes slidingly through a clip or guiding-bracket 45, secured preferably to the axle, and is provided along one edge with teeth 46, designed to be engaged by a toothed segment 47, pivotally mounted at 48 on the frame and operated by means of a forwardly-extending lever 49. The standard 31 is also provided with a longitudinal series of openings 50 to receive a stay-pin, whereby the standard may be held at any point of elevation, the pin resting upon the beam or other convenient part of the frame.

Mounted on the machine-frame, about centrally thereof, is a thumb-latch lever 51, which operates in connection with a segmental rack 52. (Indicated by dotted lines in Fig. 1 and also shown in Fig. 3.) Connected to the lever 51 is a cord or cable 52', which extends rearwardly over a suitable guide-pulley, if desired, where it may be connected to the yoke 19 of the auxiliary frame 15 or to an eye 53 at the rear end of the beam 35.

54 represents the fertilizer box or hopper, provided with a discharge nozzle or spout 55, from which a boot 56 extends downward either in rear or in advance of the furrow-plow 29. Arranged in the nozzle 55 is a horizontal feed-slide 57, provided with a central feed-opening 58, which may be increased or diminished in size by means of a sliding plate 59, slotted, as indicated at 60, and connected to the slide by means of a bolt or other fastener 61. Connected to one end of the slide 57 is a rod or wire 62, which connects at its other end to one arm of an elbow-lever 63, pivoted at 64, preferably on the axle, and having an expanded or widened end 65, designed to act in contact with and be operated by a series of inwardly and laterally projecting pins 66 on a disk or wheel 67, loosely mounted on the stationary axle 7. The hub 68 of the disk 67 is provided with an annular groove, in which is received the fork 70 of a rod 71, which extends substantially parallel to the axle 7 and is connected to the lower end of a shifting lever 72, fulcrumed at 73, preferably on the axle. The disk 67 has a clutch-faced outwardly-extending hub 74, which engages a clutch-face 75 on the inside of the adjacent wheel of the machine. By means of the lever 72 the disk 67 may be thrown into and out of engagement with said machine-wheel and rotary motion thus imparted to the disk 67 when it is desired to operate the working parts of the machine. At all other times the operation of the machine may be discontinued by simply shifting the disk 67 out of its clutched engagement with the machine-wheel. As the pins 66 come in contact with the elbow-lever 63 said lever is rocked, thus drawing on the rod 62 and moving the slide 57 in one direction for dropping a certain quantity of fertilizer or seed, as the case may be. Immediately after the pin 66 acts on the elbow-lever and leaves it a spring 76, connected to the opposite end of the slide and to the machine-frame or other suitable point, retracts the slide and shuts off the flow of fertilizer or seed in a manner that will be readily understood.

Room is left in rear of the fertilizer-box 54 for a smaller box, designed to contain seed and having a slide similar to the slide 57 and adapted to be connected to the same operating devices.

A water-tank 77 is also provided, the same being mounted upon the machine-frame between the bars 2. This tank may be of any desired size and comprises a discharge-nozzle 78, from which a flexible pipe or hose 79 leads downward, enabling an operator perched upon one of the seats 28 to direct the stream of water to any suitable point in the furrow. The water-tank is also provided in its bottom with an opening 80, normally closed by means of a valve 81, which has connected thereto an upwardly-extending stem 82, passing through the top of the tank, where it connects pivotally at 83 with one end of a centrally-pivoted lever 84, to the opposite end of which is pivotally connected a rod 85, which extends downward along the side of the tank, where it connects to one arm of an elbow-lever 86, said lever having attached to its opposite end a wire or rod 87, provided at its free end with a hook 88, which may be attached to a hook 89 on the slide 57, as shown in Fig. 12, whereby when the slide 57 is reciprocated the valve 81 is opened and closed automatically. A spring 90 is used to retract the elbow-lever 86, and thus automatically close the valve 81. The water-tank 77 is also provided in its top with a door or cover 91, enabling it to be supplied with water.

In rear of the water-tank and fertilizer-box is located a potato-hopper 92, preferably of a rectangular form and provided on its sides with rearwardly-extending seat-supports in the form of bars 93, upon the rear ends of which is placed a seat 94, upon which the operator may sit while feeding the potatoes into a chute 95, which leads downward through the bottom of the hopper. The lower portion of the chute 95 is made tapering or downwardly-contracting in size and is provided with an interiorly-arranged gate or flap 96, which is held normally closed by a spring surrounding a rod 98, which passes through an opening in the side of the chute and connects to the gate 96. The rod 98 is provided at its outer end with a hook 99, designed to be attached to the hook 89 on the feed-slide 57, (shown in Fig. 12,) so that the potatoes will be dropped at the same time that the feed-slide 57 is operated.

The machine set forth will be found exceptionally convenient in general planting or in setting plants of any description. The parts are adapted for quick interchange or substitution, and in one machine is combined a number of features, which will materially reduce the cost of agricultural machines by only requiring one main machine for what has heretofore been partially accomplished by independent machines. The dimensions, proportions, and minor details of construction are subject to changes and in their changed condition may be substituted for those shown and described without in the least departing from the nature and spirit of the invention.

Having thus described the invention, what is claimed as new is—

1. In a machine of the character set forth, the combination of a wheeled frame, planting devices mounted thereon, an auxiliary frame comprising oppositely-located and substantially parallel bars, covering-rollers journaled thereon, and an arched sectional yoke extending over said rollers and adjustably connecting the rear ends of said bars.

2. In a machine of the character set forth, the combination with a wheeled frame, of an auxiliary frame, having upwardly-inclined arms with bent extremities adapted to hook over a transverse rod on the main frame, a supporting and lifting cable connected to the rear end of said frame, and a thumb-latch lever on the machine-frame having the opposite end of the cable connected thereto.

3. In a machine of the character set forth, the combination of a wheeled frame, a standard adjustably carried by said frame and having a plow at its lower end, a toothed gear-segment for adjusting said standard up and down, guards extending rearward from the plow, and pulverizing-blades arranged between said guards and in rear of the plow.

4. In a machine of the character set forth, the combination with a wheeled frame, of an auxiliary frame, carrying rollers spaced apart, and a sectional arch at the rear end of the auxiliary frame extending over said rollers and comprising slotted and overlapping portions connected by fastening means, said frame being pivotally connected to the machine-frame at its forward end.

5. A machine of the character set forth comprising a main frame mounted on carrying-wheels, an auxiliary frame detachably and pivotally connected thereto, a pair of rollers mounted on adjustable spindles on the auxiliary frame, and means for adjusting the angles of said spindles and holding the same in their adjusted positions.

6. In a machine of the character set forth, the combination with a wheeled frame and a plow thereon, of an auxiliary frame movably supported on the main frame, a pair of rollers adjustably applied to said auxiliary frame in rear of the plow, and means for adjusting said rollers so as to change the pitch or inclination of their peripheries.

7. The combination with a wheeled frame, of an auxiliary frame detachably connected thereto, a pair of rollers carried thereby, an independent spindle or axle for each roller, a bracket in which said spindle is mounted, a slotted plate in which the spindle is adjustably received, and means coöperating with said plate to clamp and hold the spindle at any angle of inclination.

8. The combination with a furrow-plow, of rearwardly-extending, substantially parallel guards, and a series of pulverizing-blades arranged between said guards in rear of the plow.

In testimony whereof I affix my signature in presence of two witnesses.

FRED R. PARKS.

Witnesses:
   JACOB JOHENSEN,
   EDWIN R. COLVIN.